Oct. 9, 1951 E. G. HENRY 2,570,806
DRAWING KIT
Filed March 6, 1946 3 Sheets-Sheet 1

INVENTOR:
Earle G. Henry,
BY Wm F. Freudenreich,
ATTY.

Oct. 9, 1951  E. G. HENRY  2,570,806
DRAWING KIT
Filed March 6, 1946   3 Sheets-Sheet 2

INVENTOR:
Earle G. Henry,
BY Wm. F. Freudenreich,
ATTY.

Oct. 9, 1951 E. G. HENRY 2,570,806
DRAWING KIT
Filed March 6, 1946 3 Sheets-Sheet 3
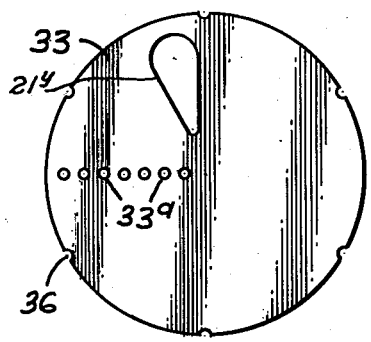
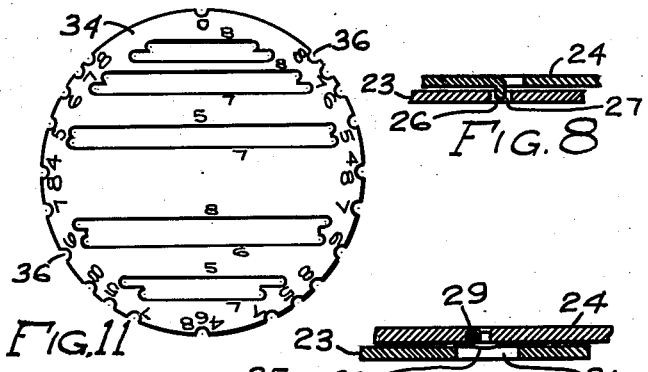
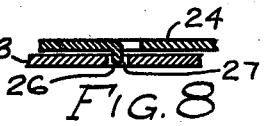
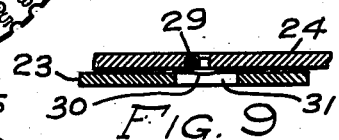
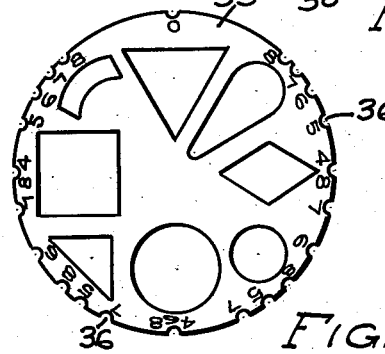
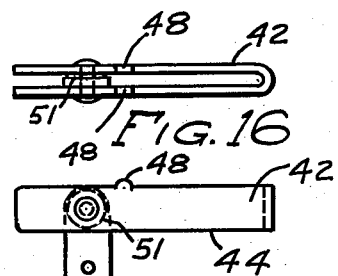
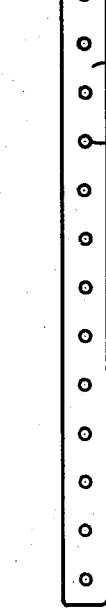
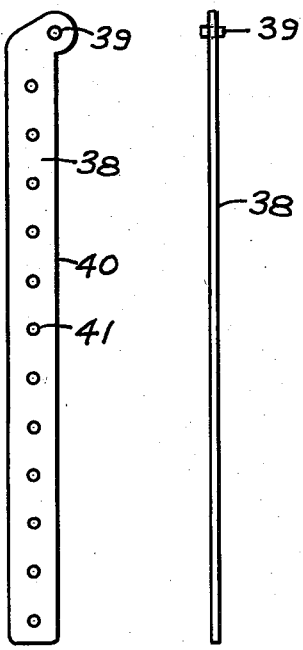
INVENTOR:
Earle G. Henry,
BY [signature]
ATTY.

Patented Oct. 9, 1951

2,570,806

UNITED STATES PATENT OFFICE 2,570,806

DRAWING KIT

Earle G. Henry, Wilmette, Ill.

Application March 6, 1946, Serial No. 652,265

5 Claims. (Cl. 35—26)

The principal objects of the invention are—

In general:

To enable persons, such as young children, who lack the manual skill required for manipulating the conventional drawing instruments such as compasses, protractors and linear measuring instruments, to draw a great variety of artistic and geometrical designs quickly and accurately, using only ordinary plain and colored pencils and crayons.

To enable such unskilled persons to choose and combine various colors and simple lines and shapes, so as to create an unlimited number of new, beautiful and interesting designs.

To provide novel means for imparting to children and others, through easy and interesting manual operations, a clear understanding of many important geometrical and artistic principles.

In particular:

To hold stationary, upon sheets of paper, stencils made of any desired material, cardboard for example, so that very young children can fill in the animal or other shapes cut out of the stencils, using pencils or crayons, without having the stencils slip and spoil their work.

To hold suitable stencils having design elements (lines and plane figures) cut in them, so that the stencils may be rotated, step by step, into several definite angular positions, thus producing regular geometrical figures having three, four, five, six, seven, eight or more sides, resembling flowers or snow crystals, for example.

To draw a great variety of circles and arcs.

To draw parallel lines, in any direction.

To draw converging lines, so as to make simple perspective drawings, for example.

To produce skeleton designs, semi-mechanically, which may later be filled in and embellished freehand.

To allow all of this work to be done on sheets of paper of any size above a certain minimum.

Figure 2:
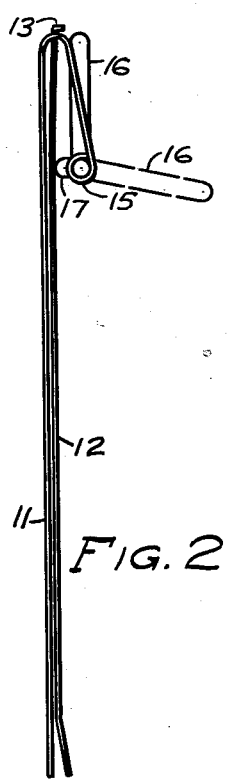
Figure 1:
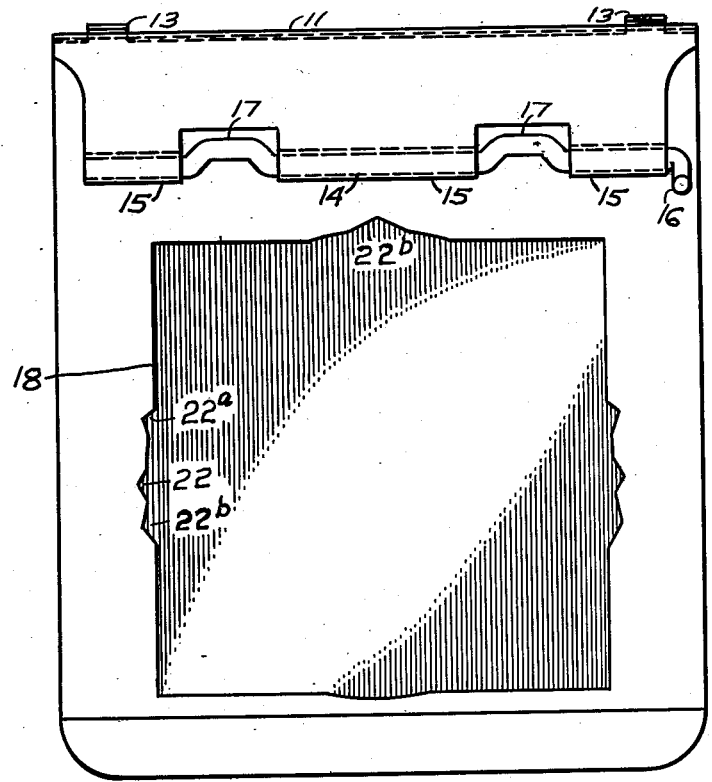
Figure 3:
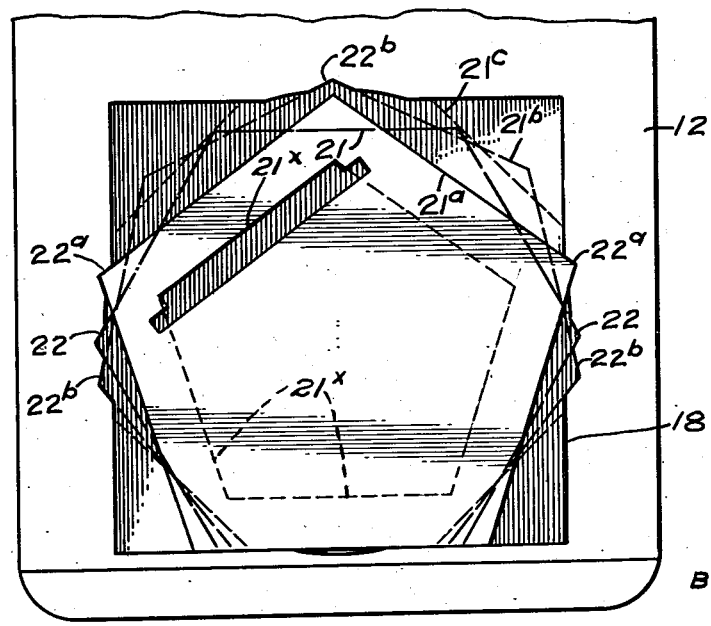
Figure 4:
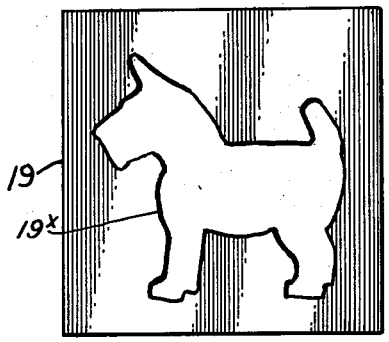
Figure 5:
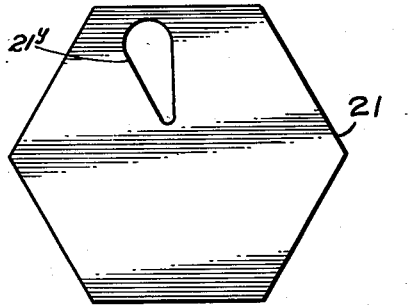
Figure 6:
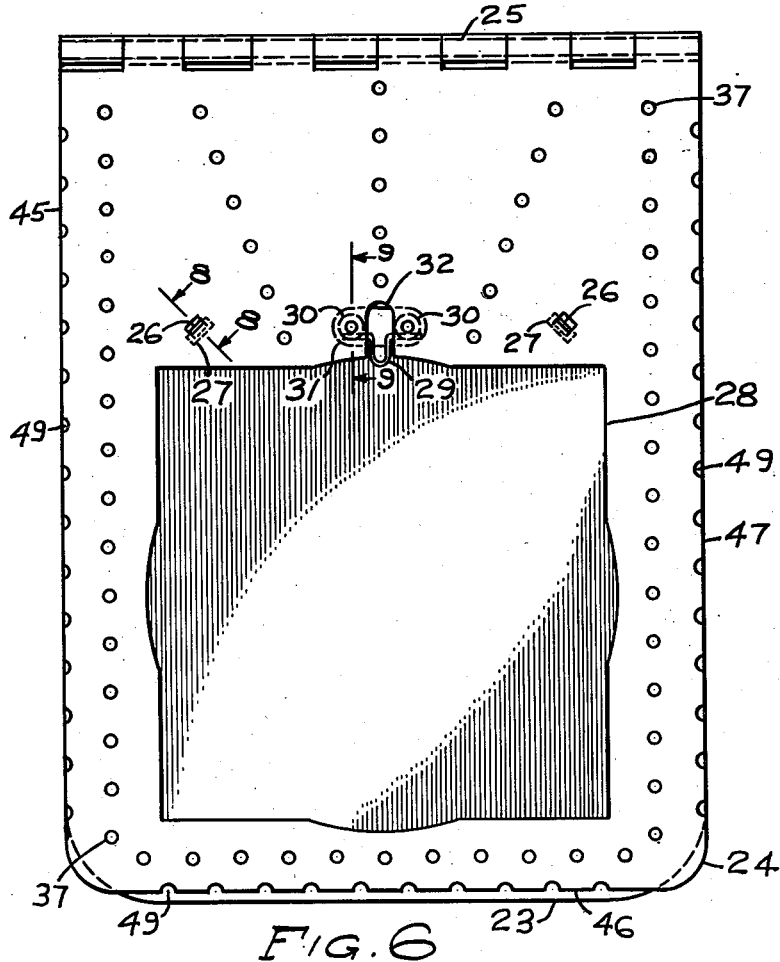
Figure 7:
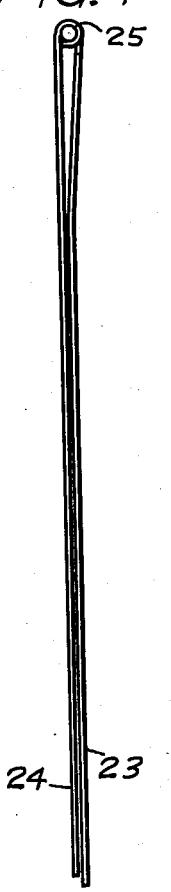

In the accompanying drawing, Figure 1 and Figure 2 are a plan view and a side edge view, respectively, of a simplified form of my invention, for use by very young children; Figure 3 is a repetition of a portion of Fig. 1, showing how stencils having various regular polygonal shapes may be used with the device; Fig. 4 is a typical square stencil; Fig. 5 is a typical "six way" stencil; Fig. 6 and Fig. 7 are a plan view and a side edge view, respectively, of a more elaborate form of my invention, intended for use by older children and adults; Fig. 8 is an enlarged, sectional view, on line 8—8 of Fig. 6; Fig. 9 is an enlarged, sectional view, on line 9—9 of Fig. 6; Fig. 10 is a typical "six way" stencil which may be used by very young children with the more elaborate form of my invention shown in Fig. 6; Fig. 11 and Fig. 12 are typical stencils to be used by older persons; Fig. 13 and Fig. 14 are a plan view and a side edge view, respectively, of a supplementary swinging arm; Fig. 15 and Fig. 16 are a plan view and an end view, respectively, of a supplementary sliding bar.

Referring to the drawing, in detail, 11 is a bottom plate, made preferably of sheet metal, on which the paper lies. 12 is a top plate, having two ears 13 which extend through slots in the extended bottom plate and are bent upward so as to hold the two plates together. A cam rod 14 turns freely in bearings 15 which are formed in the end of plate 11. One end 16 of the rod is bent laterally, to form a handle. The bent up end 16 of the cam rod, which is shown in Fig. 1, and in Fig. 2 in dotted lines, standing at right angles to the plates, when depressed as shown in full lines in Fig. 2, causes two kinks 17 in the rod to press against the top plate and force it strongly toward the bottom plate, thus gripping and holding immovable any sheet of paper which has been inserted between the two plates.

18 is a sight opening cut in the top plate which fits around and holds stationary any suitable square stencil such as stencil 19 in Fig. 4. By means of a pencil or crayon, the outline of the animal-shaped opening $19^x$ in the stencil may be drawn on the paper, or the entire exposed surface may be filled in solidly. If a suitable long strip of paper is used, together with a variety of animal-shaped stencils, a "circus parade" of animals may be drawn, merely by shifting the paper along, step by step, with each change of stencils.

The six-sided stencil 21 of Fig. 5, and provided with an opening $21^y$ shaped like the petal of a flower, fits into notches 22, as indicated in Fig. 3, and may be placed in the opening 18 in six different angular positions successively, so that a six-petalled flower may be drawn. If the stencil is turned upside down and again shifted around, six additional petals may be drawn, producing a "flower" having twelve equally spaced petals. It is obvious that several other, differently shaped openings might have been provided in this same stencil, each one forming the basis for other designs, by itself or in combination with others. As indicated in Fig. 3, stencils outwardly formed as a regular pentagon $21^a$, heptagon $21^b$ or octagon $21^c$, and having design openings cut in them, may be fitted into the opening 18 and shifted around so as to draw figures having three, four, five, six, seven, eight or more sides; pentagon stencils and heptagon stencils being engaged, respectively with notches $22^a$ and $22^b$, the pentagon stencil being shown in full lines and containing an opening $21^x$ to permit such five sided figure to be drawn, and the other stencils being shown in broken and dotted lines. The opening 18 is shaped so as to fit circular stencils also.

23 and 24 are the back and front plates, respectively, of the more advanced form of my invention illustrated in Figs. 6 and 7, and function in substantially the same way as plates 11 and 12 already described. The straight, round rod 25 serves to hinge plates 23 and 24 together, so that this form of my device, unlike the other, may be opened wide, like a pair of book covers.

26, 26, detailed in Fig. 8, are two ears sheared out of the metal of plate 24 and bent at right angles with the plate so as to enter slots 27 in plate 23. When the two plates are forcibly closed together, upon a sheet of paper between them, the ears 26 perforate and grip the paper, holding it securely in place.

The opening 28 in plate 24 is shaped so as to fit square and circular stencils. 29 is a piece of stiff, round wire, bent into the form of a narrow U the free ends of which are bent outwardly in opposite directions in the plane of the U. The end portions serve as journals that lie in grooves formed in the under side of plate 24, as best shown in Fig. 9, and are retained therein by the overlapping flat heads of the two rivets 30, 30. The two rivet heads project into a clearance slot 31 in plate 23, the paper being slightly dented by them.

The middle, loop portion of the wire 29 lies within a slot 32 cut into plate 24 through the edge that bounds opening 28 and may be swung upward so as to lie entirely within this slot, or downward so as to project into the large sight opening 28. In the latter position, the rounded end of the loop in the wire may be made to engage any of the semi-circular notches 36 in the edge of one of the round stencils 33, 34 or 35, of Figs. 10, 11 and 12, respectively, thus preventing the stencil from rotating.

Stencil 33, having six equally spaced notches, may be indexed into six (or twelve) fixed positions almost as readily as in the case of the hexagonal stencil 21, already discussed. This stencil contains an opening 21ʸ similar to that in Fig. 5. Stencils 34 and 35 have additional sets of notches, as shown, each set dividing the perimeter into four, five, six, seven or eight equal parts, respectively. The notches to be used when drawing five-sided figures are stamped with the numeral "5," and each of the other sets with its appropriate numeral. The zero ("0") notch is the common starting point for all of these sets of notches. Children too young to read numbers could not, of course, use stencils 34 and 35 properly.

Each of the ten edges of the five slots in stencil 34 may be used for drawing a four, five, six, seven or eight-sided regular polygon, or a five, six, seven or eight-sided star. For example, in drawing a seven-sided figure, one selects an edge stamped with the numeral "7" and all of the notches so stamped, together with the zero notch. Each of the openings in stencil 35 may be used for four, five, six, seven or eight-sided designs, and in many cases one of the designs may be super-imposed on another design, in each segment drawn.

If the wire 29 is swung clear of the opening 28, a circular stencil such as 33, may be rotated so as to draw a variety of concentric circles, by placing the point of a pencil or crayon through one of the holes 33ᵃ, against the paper, while rotating the stencil.

Plate 24 contains many small, round holes 37 in the space surrounding the sight opening 28, to provide anchoring points about which arm 38, illustrated in Figs. 13 and 14, may swing when this arm is laid flat on the plate. Arm 38 has at one end a round peg or pin 39 protruding from both flat faces; either end of the peg or pin being adapted to be inserted in any one of holes 37 and be a snug fit therein. It will be seen that the axis of the peg intersects the line of one long edge 40 of the arm, extended. Therefore, when a pencil, pen or crayon is moved along said edge of the arm in contact with an underlying sheet of paper, while the arm extends over the sight opening, a line is drawn on the paper that will, if extended, intersect the hole that contains the peg. By swinging the arm from one position to another, the fit of the peg in any hole permitting such movement, any desired number of straight lines, radial with respect to that hole, may be drawn. The arm 38 is provided with a row of holes 41 extending throughout the length thereof. If the point of a pencil or crayon is placed in one of the holes 41 while the arm is swung around its pivoting peg 39, an arc can be drawn on the paper.

The sliding bar device shown in Figs. 15 and 16 comprises a head 42 and a blade 43 pivotally connected, and is similar in operation and purpose to a draftman's T-square. A plain edge 44 of the angularly adjustable head may be held against any one of the edges 45, 46 or 47 of the top plate while one of the long edges of the blade 43 serves to guide a pencil or crayon. The other long edge of the head has thereon ears 48, while edges 45, 46 and 47 of plate 24 contain notches 49, complementary to the ears. If the head is reversed, so that one of the ears 48 may be brought into engagement with one of the notches 49, in an edge of the top plate, the bar may easily be held in a definite position. All of the notches in the edges of the top plate are in pairs symmetrically positioned about the longitudinal center line of the top plate. Therefore, symmetrical pairs of lines may be drawn, in great variety, simply by engaging the ears 48 with any two symmetrically placed notches in turn. Blade 43 is provided with holes 50, to be used as additional pivoting centers for the swinging arm 38. Head 42 is shown as composed of a flat strip bent into U-shape; the blade 43 being entered in the space between the arms of the U. A washer 51, made of spring material and bent into a cylindrical curve before assembly, is placed between the blade and an arm of the U-shaped head, around the pivot, to maintain pressure between the relatively movable blade and head and thus provide a moderately rigid connection between the two.

Each of the two variations of my invention which I have portrayed and described has advantages and disadvantages. The gripping means for the paper shown in Figs. 1 and 2 is less likely than the other to release the paper accidentally, which is an important factor in the case of very young children. However, since the two plates resemble the covers of a book, children may attempt to pull them apart by force, bending and damaging the upper plate. The other design is free from this hazard. The more advanced design is better adapted for using the swinging arm and the sliding bar, since the upper surface of the top plate 24 is clear of obstructions.

For a very young child, there is probably more logical connection between a five-sided stencil and the five-sided figures which it produces than in the case of a round stencil having five small, round notches in its edge, so that my simpler design is educationally the better of the two for beginners. However, for anyone mature enough to read the stamped numerals, there is great economy in being able to draw a variety of figures having three, four, five, six, seven, eight or more sides, all by means of the one round stencil; each stencil of a polygonal shape can, of course, produce designs having only its own number of sides. Moreover, all of the designs produced by the round stencils are concentric with each other, which is not the case with the variously shaped stencils used with the simpler form of the device.

Each of the two constructions comprises substantially the same basic elements, arranged in substantially the same way. In each case, there are two flat plates, one above and one below the paper and joined to each other along one side only so that large sheets of paper, if desired, may be inserted between the two plates and may project outwardly beyond the plates in every direction except toward the side where the plates join one another. In each case, likewise, opposed gripping elements on opposite sides of the paper grip and position it relative to the plates. In each case, an opening is provided in one of the plates which fits around and positions suitable stencils. Finally, in each case, indexing means are provided for holding each of the stencils in a plurality of definite angular positions without shifting the position of its geometrical center.

It is important to note that there is no necessary relationship between all of the construction features shown in either one of the designs. Either one of the arrangements for positioning the stencils could have been combined equally well with either one of the paper-gripping means shown.

While I have illustrated and described with particularity only two preferred forms of my invention including two attachments and a few stencils, I do not desire to be limited to the exact structural details thus illustrated and described; but intend to cover all forms and arrangements that come within the definitions of the invention constituting the appended claims.

I claim:

1. In a device for drawing design elements symmetrically disposed about a central point, comprising a plate adapted to lie upon a sheet on which the drawing is to be done and containing a sight opening through which a portion of the sheet is exposed, means cooperating with the plate to hold the sheet securely in position beneath the opening, a stencil of a size and shape to fit in said opening in different angular positions about an axis at right angles thereto and to be held by the plate against bodily movement transversely of such axis, cooperating elements on the plate and on the stencil to mark relative angular positions of the latter corresponding to the angular spacings of the corners of a polygon, and the stencil containing an opening through which a drawing medium may be inserted and along a bounding edge whereof it may be guided for drawing on the sheet; the latter opening having an elongated bounding edge that extends at right angles to a radius from said axis which bisects said edge, and said edge being sufficiently long to permit a drawing medium, moved along the same, to draw in each angular position of the stencil a side of the polygon that has the same number of sides as the polygon that determines the angular positions of the stencil.

2. A device for drawing design elements symmetrically disposed about a central point, comprising a plate adapted to lie upon a sheet on which the drawing is to be done and containing a sight opening through which a portion of the sheet is exposed, means cooperating with the plate to hold the sheet securely in position beneath said opening, a stencil of a size and shape to fit in said opening in different angular positions about an axis at right angles thereto and to be held by the plate against bodily movement transversely of such axis, cooperating elements on the plate and stencil to mark relative angular positions of the latter corresponding to the angular spacings of the corners of a polygon, and the stencil containing elongated slots through which a drawing medium may be inserted and along the long edges of which it may be guided for drawing on the sheet, the slots being so placed and being sufficiently long to cause lines so drawn in the various angular positions of the stencil to meet end to end in different groups and form polygons and two stars.

3. A device for drawing design elements in relative angular positions corresponding to the angular spacings of the corners of several regular polygons having different numbers of sides, comprising a plate adapted to lie upon a sheet on which the drawing is to be done and containing a sight opening through which a portion of the sheet is exposed, means cooperating with the plate to hold the sheet securely in position beneath said opening, a round stencil of a size to fit rotatably in said sight opening and to be held by the plate against transverse bodily movement in the plane thereof, the stencil having therein openings through which a drawing medium may be inserted and bounding edges for such openings along which the drawing medium may be moved while drawing on the sheet; and cooperating elements on the plate and stencil, to mark sets of angular positions of the stencil corresponding in their respective spacings to the angular spacings of the corners of said several polygons, and to lock the stencil in any one of its said angular positions into which it is brought.

4. A device for drawing design elements as set forth in claim 3, wherein the guiding edge of each of several stencil openings is as long as the side of a polygon having as many sides as one of said several polygons and is spaced from the center of the stencil a distance equal to that between a side and the center of a polygon to be drawn.

5. A device for drawing design elements as set forth in claim 3, wherein the number of sides in some of the first-mentioned polygons are odd while in others they are even.

EARLE G. HENRY.

REFERENCES CITED

The following references are of record in the file of this patent:

UNITED STATES PATENTS

| Number | Name | Date |
|---|---|---|
| 83,115 | Wilcox | Oct. 13, 1868 |
| 287,030 | King | Oct. 23, 1883 |
| 396,505 | Nolan | Jan. 25, 1889 |
| 684,142 | Ward | Oct. 8, 1901 |
| 864,254 | Perkins | Aug. 27, 1907 |
| 1,247,160 | Senseney | Nov. 20, 1917 |
| 1,262,857 | Sinnot | Apr. 16, 1918 |
| 1,391,530 | Bustillo | Sept. 20, 1921 |
| 1,425,597 | La Borie | Aug. 15, 1922 |
| 1,598,208 | McAdam | Aug. 31, 1926 |
| 1,672,751 | Conti | June 5, 1928 |
| 1,821,369 | Wetterstrand | Sept. 1, 1931 |
| 1,878,633 | Hoferer | Sept. 20, 1932 |

FOREIGN PATENTS

| Number | Country | Date |
|---|---|---|
| 486,117 | Germany | 1929 |